(12) United States Patent
Yeom et al.

(10) Patent No.: US 11,762,105 B2
(45) Date of Patent: Sep. 19, 2023

(54) APPARATUS FOR DETECTING POSITION OF RADIATION SOURCE

(71) Applicants: Korea University Research and Business Foundation, Seoul (KR); Korea Atomic Energy Research Institute, Daejeon (KR)

(72) Inventors: Jung-Yeol Yeom, Seoul (KR); Seop Hur, Sejong-si (KR); Inyong Kwon, Daejeon (KR); Chanho Kim, Seoul (KR)

(73) Assignees: Korea University Research and Business Foundation, Seoul (KR); Korea Atomic Energy Research Institute, Daejeon (KR)

( * ) Notice: Subject to any disclaimer, the term of this patent is extended or adjusted under 35 U.S.C. 154(b) by 316 days.

(21) Appl. No.: 17/496,975

(22) Filed: Oct. 8, 2021

(65) Prior Publication Data

US 2022/0026589 A1    Jan. 27, 2022

Related U.S. Application Data

(63) Continuation-in-part of application No. 17/413,060, filed as application No. PCT/KR2019/017992 on Dec. 18, 2019, now Pat. No. 11,675,093.

(30) Foreign Application Priority Data

Dec. 18, 2018    (KR) ........................ 10-2018-0163801

(51) Int. Cl.
  *G01T 1/169*    (2006.01)
  *G01T 7/00*    (2006.01)
  *G01T 1/20*    (2006.01)

(52) U.S. Cl.
  CPC ............ *G01T 1/169* (2013.01); *G01T 1/2002* (2013.01); *G01T 1/2006* (2013.01); *G01T 7/00* (2013.01)

(58) Field of Classification Search
  CPC ..... G01T 1/169; G01T 1/2002; G01T 1/2006; G01T 7/00; G21C 17/002
  See application file for complete search history.

(56) References Cited

U.S. PATENT DOCUMENTS

| 9,529,097 B1 | 12/2016 | Dolinsky et al. |
| 2005/0045827 A1 | 3/2005 | Katagiri et al. |

(Continued)

FOREIGN PATENT DOCUMENTS

| GB | 1368821 A | 10/1974 |
| JP | 8-94758 A | 4/1996 |

(Continued)

OTHER PUBLICATIONS

United States Office Action dated Aug. 8, 2022, in related U.S. Appl. No. 17/413,060 (12 pages in English).

(Continued)

*Primary Examiner* — Kiho Kim
(74) *Attorney, Agent, or Firm* — NSIP Law

(57) ABSTRACT

The present invention relates to an apparatus for determining the location of a radiation source. The apparatus for determining the location of a radiation source according to the present invention comprises: a collimator part for selectively passing radiation therethrough according to the direction in which the radiation is incident; a scintillator part for converting the radiation incident from the collimator part into a light ray; a first optical sensor for converting the light ray incident from one end of the scintillator part into a first optical signal; a second optical sensor for converting the light ray incident from the other end of the scintillator part (Continued)

into a second optical signal; and a location information acquisition part for acquiring information on the location where the light ray is generated in the scintillator part, by using the second optical signal and the second optical signal.

11 Claims, 6 Drawing Sheets

(56) References Cited

U.S. PATENT DOCUMENTS

| | | | |
|---|---|---|---|
| 2012/0205530 A1* | 8/2012 | Beaulieu | G01T 1/201 250/252.1 |
| 2017/0199283 A1 | 7/2017 | Hu et al. | |

FOREIGN PATENT DOCUMENTS

| | | |
|---|---|---|
| JP | 2005-121583 A | 5/2005 |
| JP | 2013-39362 A | 2/2013 |
| JP | 2017-83299 A | 5/2017 |
| KR | 10-1445152 B1 | 10/2014 |
| WO | WO 2018/005940 A1 | 1/2018 |

OTHER PUBLICATIONS

International Search Report dated Apr. 28, 2020 in counterpart International Patent Application No. PCT/KR2019/017992 (2 pages in English and 2 pages in Korean).

* cited by examiner

[FIG. 1]
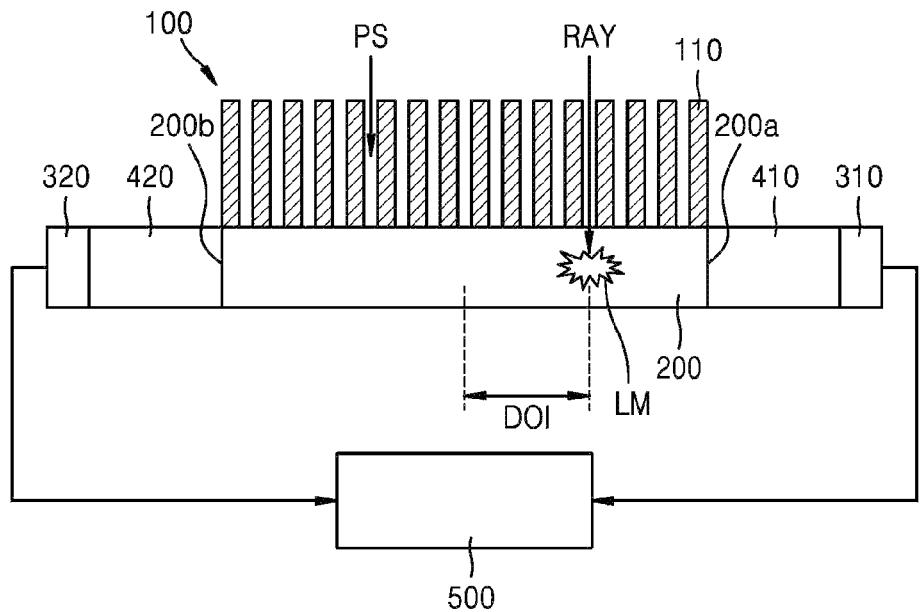
[FIG. 2]
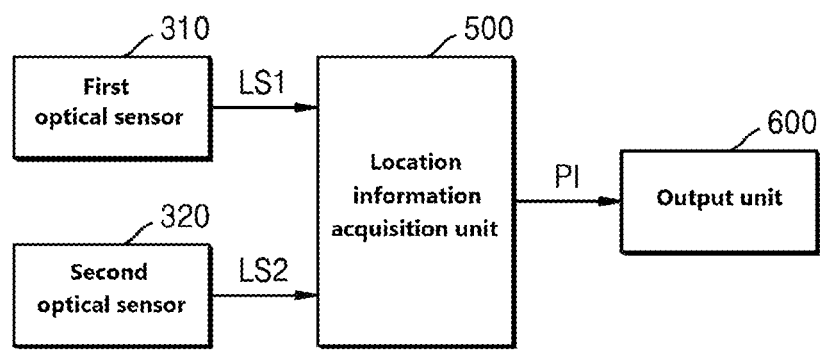

[FIG. 3]
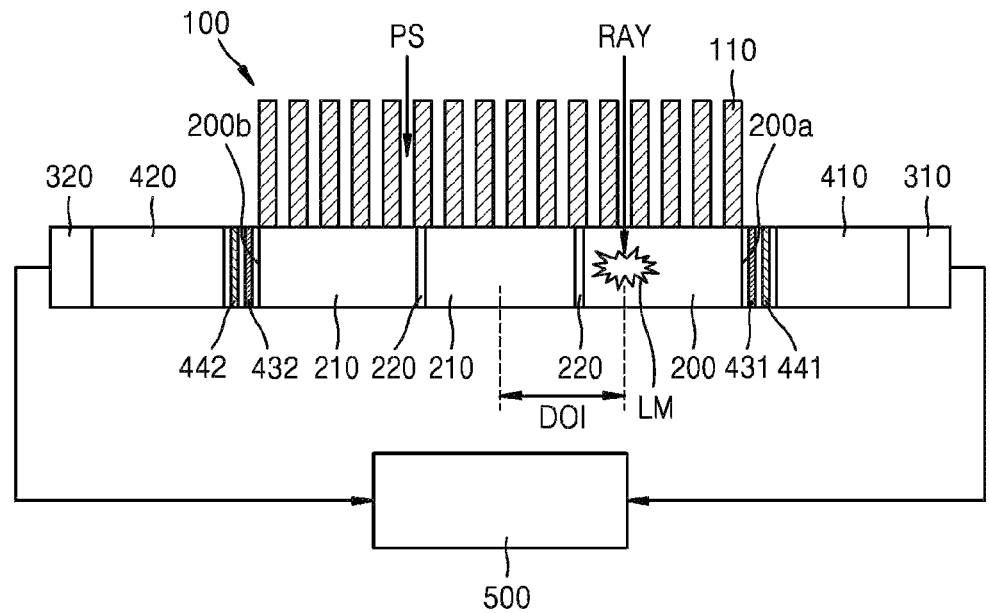
[FIG. 4]
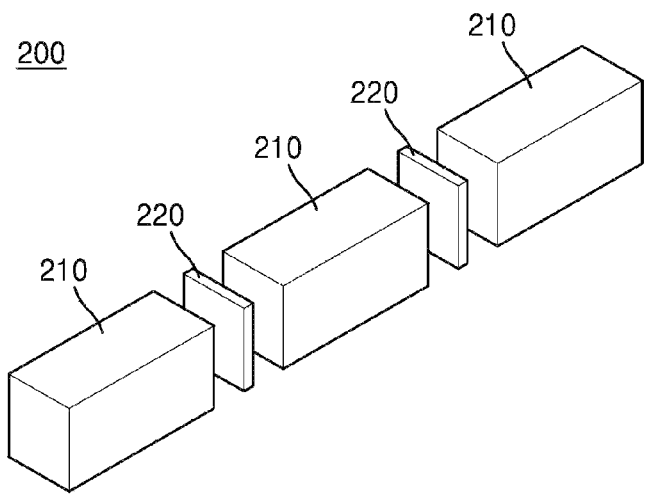

[FIG. 5]
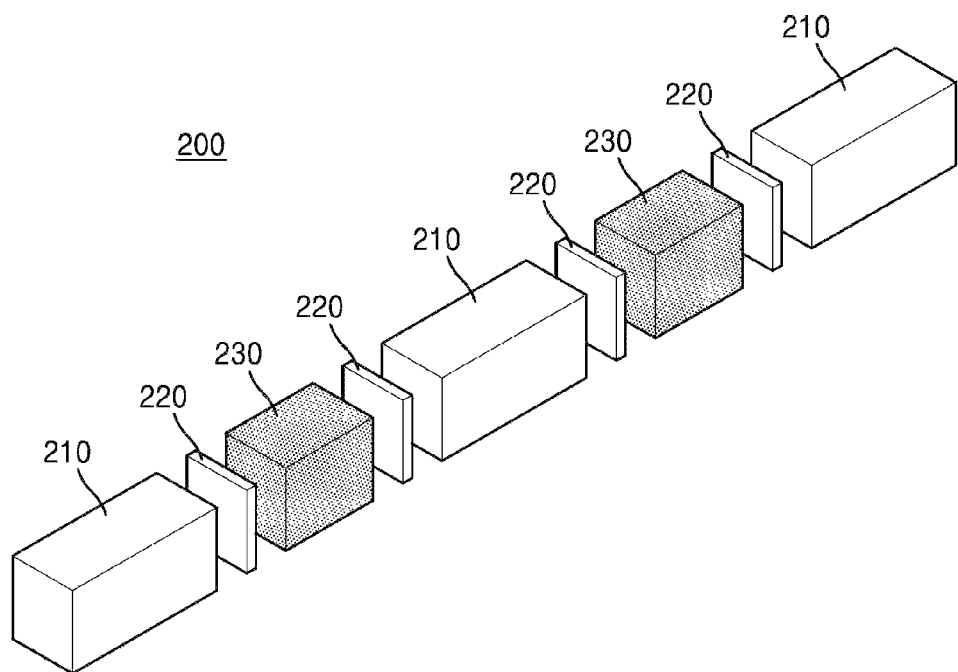
[FIG. 6]
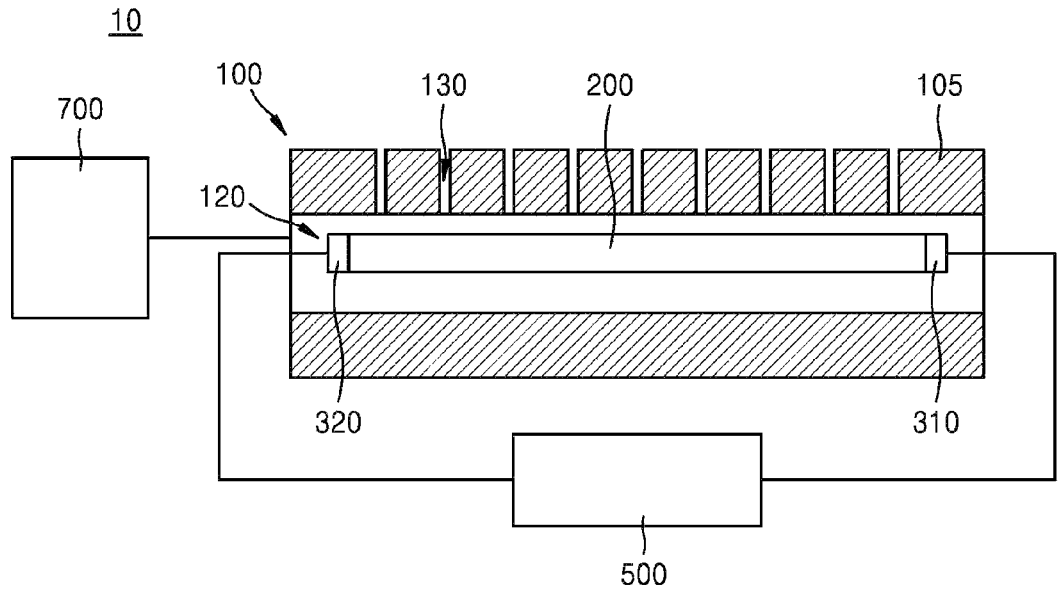

[FIG. 7]
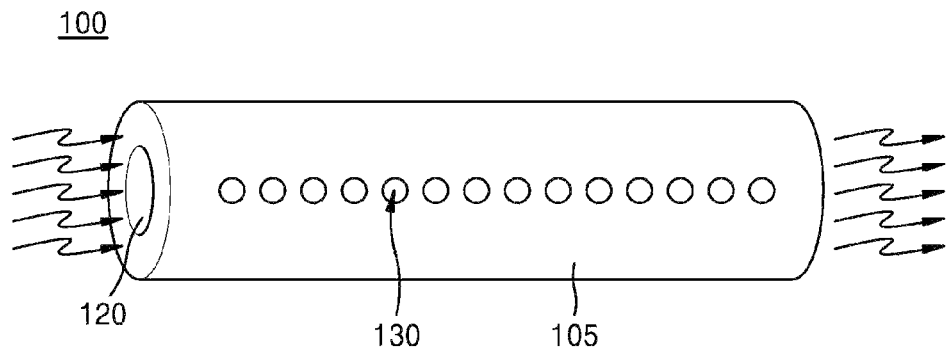
[FIG. 8]
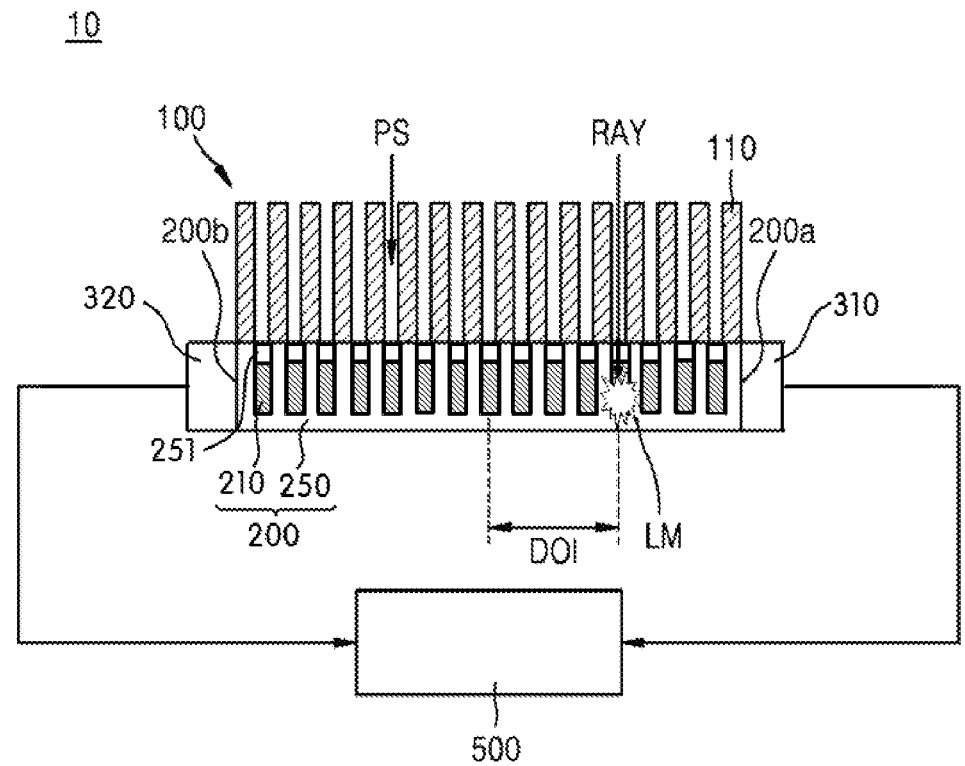

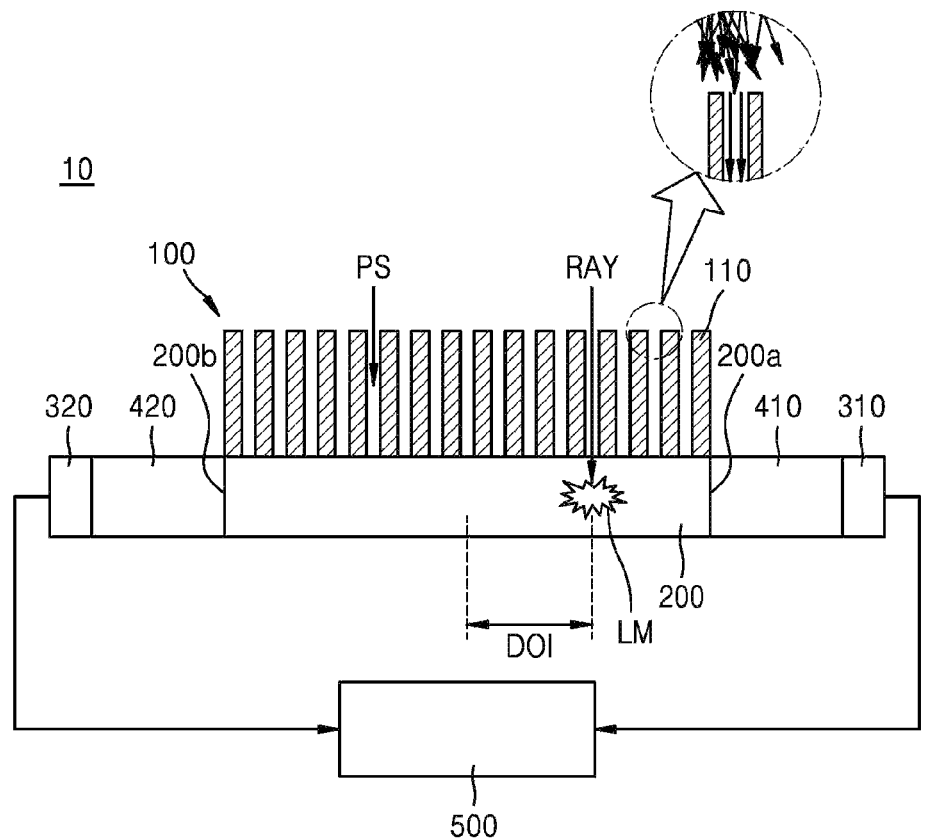
[FIG. 9]

[FIG. 10]
10
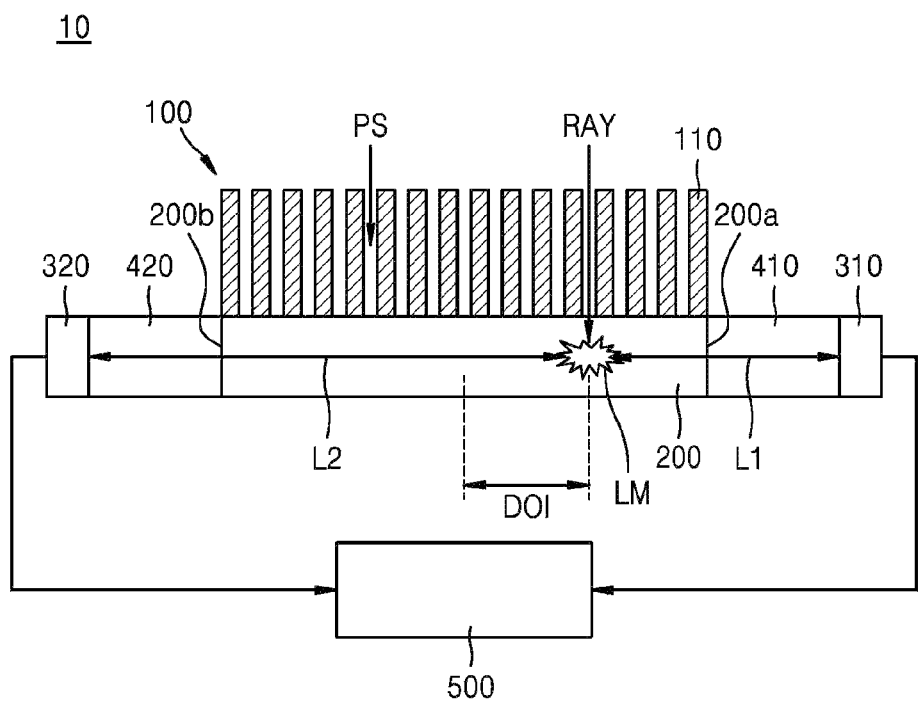

APPARATUS FOR DETECTING POSITION OF RADIATION SOURCE

CROSS-REFERENCE TO RELATED APPLICATIONS

This application is a continuation-in part of U.S. patent application Ser. No. 17/413,060 filed on Jun. 11, 2021 which is a U.S. National Stage Application of International Application No. PCT/KR2019/017992, filed on Dec. 18, 2019, which claims the benefit under 35 USC § 119(a) of Korean Patent Application No. 10-2018-0163801 filed on Dec. 18, 2018, in the Korean Intellectual Property Office, the entire disclosure of which is incorporated herein by reference for all purposes.

TECHNICAL FIELD

The present invention relates to a system for determining the location of a radiation source, and more specifically to a system that can recognize information on where radiation leakage occurs even in a high-temperature environment to determine the location of a radiation source.

BACKGROUND ART

In recent years, earthquakes have occurred frequently in South Korea. Thus, safety issues of nuclear power plants have been raised in Korea. Nuclear power plants currently operating in South Korea are designed to withstand earthquakes with magnitudes of 6.5 to 7. Due to frequent earthquakes and aging seismic designed structures, however, cracks are likely to occur in nuclear power plants, rendering nuclear power plants vulnerable to earthquakes with magnitudes lower than the established seismic design criteria.

In an attempt to avoid safety problems of nuclear power plants in advance and cope with severe nuclear accidents and terrorist attacks, there is a need to develop radiation detection systems that can constantly monitor radiation leakage from the cores of nuclear reactors operating under high temperature and high pressure conditions.

During a serious nuclear accident at a nuclear power plant, the internal temperature of the core may be raised up to 2000° C. and the temperature of a containment building where a radiation detection system is installed may be increased to a maximum of 700° C. However, current radiation detection systems cannot be used in high-temperature environments and cannot acquire information on where radiation leakage occurs, thus being unsuitable for real-time detection of damage to nuclear reactors.

Under these circumstances, studies on radiation detection systems capable of acquiring accurate information on where radiation leakage occurs even in high-temperature environments are currently underway.

DETAILED DESCRIPTION OF THE INVENTION

Problems to be Solved by the Invention

One object of the present invention is to provide a system that can recognize information on where radiation leakage occurs even in a high-temperature environment to determine the location of a radiation source.

A further object of the present invention is to provide a system for determining the location of a radiation source that can recognize information on where radiation in a nuclear power plant (for example, the core of a nuclear reactor) leaks out in a high-temperature environment to detect core meltdown and/or damage to the nuclear reactor in real time.

Objects of the present invention are not limited to the above-mentioned objects and other unmentioned objects may be clearly understood by those skilled in the art from the following description.

Means for Solving the Problems

A system for determining the location of a radiation source according to the present invention includes: a collimator unit through which radiation selectively passes depending on its incident direction; a scintillator unit converting the incident radiation from the collimator unit into light; a first optical sensor converting the incident light from one end of the scintillator unit into a first optical signal; a second optical sensor converting the incident light from the other end of the scintillator unit into a second optical signal; and a location information acquisition unit acquiring information on where the light is generated in the scintillator unit based on the first and second optical signals.

In one embodiment, the location information acquisition unit may generate first optical energy information on the first optical signal and second optical energy information on the second optical signal and may use the first optical energy information and the second light energy information to acquire the information on where the light is generated.

In one embodiment, the location information acquisition unit may generate a first time stamp from the first optical signal and a second time stamp from the second optical signal and may use the first and second time stamps to acquire the information on where the light is generated.

In one embodiment, the collimator unit may include a plurality of collimators spaced apart from each other and arranged between the one end and the other end of the scintillator unit.

In one embodiment, the scintillator unit may include a plurality of scintillators spaced apart from each other and adhesive members, each of which bonds the two adjacent scintillators to each other.

In one embodiment, the scintillator unit may include a plurality of scintillators spaced apart from each other, light guide units positioned between the adjacent scintillators, and adhesive members bonding the adjacent scintillators to the light guide units.

In one embodiment, each of the scintillators may be made of a material selected from $Gd_2SiO_5$:Ce (GSO:Ce), $Pr:Lu_3Al_5O_{12}$ (Pr:LuAG), $Gd_2Si_2O_7$:Ce (GPS), and halide-based materials.

In one embodiment, the system may further include a first light guide member positioned between the one end of the scintillator unit and the first optical sensor spaced apart from the one end of the scintillator unit to guide the light irradiated from the one end of the scintillator unit to the first optical sensor and a second light guide member positioned between the other end of the scintillator unit and the second optical sensor spaced apart from the other end of the scintillator unit to guide the light irradiated from the other end of the scintillator unit to the second optical sensor.

In one embodiment, the system may further include a first wavelength shifter converting the wavelength band of the light propagating from the one end of the scintillator unit to the first light guide member into a pass-band wavelength range of the first light guide member and a second wavelength shifter converting the wavelength band of light propagating from the other end of the scintillator unit to the second light guide member into a pass-band wavelength range of the second light guide member.

In one embodiment, the system may further include a first optical amplifier amplifying the light propagating from the one end of the scintillator unit to the first light guide member and a second optical amplifier amplifying the light propagating from the other end of the scintillator unit to the second light guide member.

In one embodiment, the system may further include a cooling unit cooling the scintillator unit; the collimator unit includes a housing, a receiving hole penetrating the housing in a direction corresponding to the lengthwise direction of the scintillator unit, and a plurality of incident holes extending in a first direction from the receiving hole so as to penetrate the housing and spaced apart from each other; the scintillator unit is positioned in the receiving hole and overlaps the incident holes; and the cooling unit supplies a fluid into the receiving hole to cool the scintillator unit.

In one embodiment, the housing may be made of tungsten (W) or lead (Pb).

In one embodiment, the scintillator unit may include: a light guide arranged between the first and second optical sensors and having a plurality of insertion holes spaced apart from each other on an outer surface thereof; and a plurality of scintillators, each of which is inserted into the corresponding insertion hole.

Specific details of other embodiments are included in the detailed description and the accompanying drawings.

Effects of the Invention

According to exemplary embodiments of the present invention, the system can accurately determine a location where radiation in an inspection object (e.g., a nuclear reactor) leaks out as a result of damage to the inspection object. Therefore, the system can monitor damage to the inspection object in real time.

In addition, the use of the scintillation unit suitable even in a high-temperature environment allows the system to monitor an inspection object in real time.

Furthermore, the system of the present invention can be manufactured at low cost compared to prior art systems. Therefore, the system of the present invention is more price competitive than prior art systems.

Effects of the present invention are not limited to the above-mentioned effects and other unmentioned effects may be clearly understood by those skilled in the art from the description of the claims.

BRIEF DESCRIPTION OF THE DRAWINGS

FIG. 1 is a schematic view illustrating a system for determining the location of a radiation source according to one embodiment of the present invention.

FIG. 2 is a block diagram illustrating the system of FIG. 1.

FIG. 3 is a schematic view illustrating a system for determining the location of a radiation source according to a further embodiment of the present invention.

FIG. 4 is an exploded perspective view illustrating an exemplary scintillation unit of the system of FIG. 3.

FIG. 5 is an exploded perspective view illustrating another exemplary scintillation unit of the system of FIG. 3.

FIG. 6 is a schematic diagram illustrating a system for determining the location of a radiation source according to another embodiment of the present invention.

FIG. 7 is a schematic view illustrating a collimator unit of the system of FIG. 6.

FIG. 8 is a schematic view illustrating a system for determining the location of a radiation source according to another embodiment of the present invention.

FIGS. 9 and 10 are schematic views illustrating the operation of a system for determining the location of a radiation source according to one embodiment of the present invention.

BEST MODE FOR CARRYING OUT THE INVENTION

The advantages and features of the present invention and methods for achieving them will become more apparent from the following embodiments described in detail below in conjunction with the accompanying drawings. However, the present invention is not limited to the illustrated embodiments and may be embodied in various different forms. Rather, the disclosed embodiments are provided so that the disclosure of the present invention will be thorough and complete, and will fully convey the scope of the invention to those skilled in the art to which the present invention pertains. The scope of the present invention is defined by the claims that follow. Like reference numerals indicate like elements throughout the specification.

The embodiments described herein will be described with sectional and/or plan views as ideal exemplary views of the present invention. In the drawings, the thicknesses of layers and regions are exaggerated for clarity of illustration. Thus, the regions illustrated in the figures are schematic in nature and their shapes are not intended to illustrate the precise shape of a region of a device and are not intended to limit the scope of the present invention. It will be understood that, although the terms first, second, third, etc. may be used herein to describe various elements, these elements should not be limited by these terms. These terms are only used to distinguish one element from another. The embodiments described herein also include complementary embodiments thereof.

The terms used in the present application are merely used to describe particular embodiments, and are not intended to limit the present invention. As used herein, the singular forms "a", "an" and "the" are intended to include the plural forms as well, unless the context clearly indicates otherwise. It will be further understood that the terms "comprises (includes)" and/or "comprising (including)" when used in this specification, specify the presence of stated elements, steps, operations, and/or components, but do not preclude the presence or addition of one or more other elements, steps, operations, components, and/or groups thereof.

Unless otherwise defined, all terms (including technical and scientific terms) used herein have the same meaning as commonly understood by one of ordinary skill in the art to which the present invention belongs. It will be further understood that terms, such as those defined in commonly used dictionaries, will not be interpreted in an idealized or overly formal sense unless expressly so defined herein.

The concepts of the present invention and their embodiments will now be described in detail with reference to the accompanying drawings.

FIG. 1 is a schematic view illustrating a system for determining the location of a radiation source according to one embodiment of the present invention. FIG. 2 is a block diagram illustrating the system of FIG. 1.

Referring to FIGS. 1 and 2, the system 10 can accurately determine a location where radiation RAY is irradiated. In addition, the system 10 can determine the location of a source from which radiation RAY is irradiated even in a high-temperature environment. The system 10 includes a collimator unit 100, a scintillator unit 200, a first optical sensor 310, a second optical sensor 320, and a location information acquisition unit 500. The system 10 may include an output unit 600, a first light guide member 410, and a second light guide member 420.

The radiation RAY can selectively pass through the collimator unit 100 depending on its incident direction. For example, when the incident radiation RAY is inclined at an angle with respect to the scintillator unit 200, the collimator unit 100 can block the inclined radiation RAY from entering the scintillator unit 200. The radiation RAY incident in a direction substantially perpendicular to the lengthwise direction of the scintillator unit 200 can pass through the collimator unit 100. The collimator unit 100 may be a mechanism for reducing the dose rate of the radiation to the lowest possible level.

The collimator unit 100 may include a plurality of collimators 110. The plurality of collimators 110 may be spaced apart from each other. With this arrangement, the two adjacent collimators 110 define a space through which the radiation RAY passes (hereinafter, a passing space PS). The plurality of collimators 110 may be positioned between one end 200a and the other end 200b of the scintillator unit 200. The passing spaces PS may overlap the scintillation unit 200, which will be described later.

In one embodiment, the collimators 110 may be arranged at regular intervals. With this arrangement, the passing spaces PS may have the same width. In an alternative embodiment, the width of at least one of the passing spaces PS may be different from that of the other passing spaces PS.

The transmittance of the collimators 110 for the radiation RAY incident toward the scintillator unit 200 may vary depending on the height of the collimators 110 and the width of the passing spaces PS. The height of the collimators 110 may be defined as the length of the collimators 110 in a direction perpendicular to the widthwise direction of the passing spaces PS. For example, as the height of the collimators 110 increases, the transmittance of the collimators 110 for the radiation RAY incident toward the scintillator unit 200 may decrease. That is, when the radiation RAY is inclined at an angle with respect to the scintillator unit 200, the collimator unit 100 can block the inclined radiation RAY from entering the scintillator unit 200. As the width of the passing spaces PS decreases, the location range of the radiation source in the location information acquisition unit 500 may decrease, indicating that the system 10 can determine the location of the radiation source with improved accuracy.

The collimators 110 can be constructed taking into comprehensive consideration various factors such as material, density, coefficient of thermal expansion, hygroscopicity, and reactivity to ensure stability under high temperature and high humidity conditions. For example, the collimators 110 may be made of a radiation absorbing material such as lead (Pb) or tungsten that can limit the direction and diffusion of radiation.

The scintillator unit 200 can convert the radiation RAY incident through the collimators 110 into light. In one embodiment, only one single scintillator 210 may be provided for the scintillator unit 200. The scintillator unit 200 may have a rectangular shape in cross section that is long in one direction. In this case, the scintillator 210 has a rectangular shape in cross section that is long in one direction.

The scintillator unit 200 may include a plurality of scintillators. The scintillators 210 can induce a scintillation phenomenon in which pulsed light is emitted as a result of interaction of the incident radiation RAY with a material for the scintillators. Examples of suitable materials for the scintillator 210 include organic materials, inorganic materials, gases, liquids, and solids. In one embodiment, the scintillators 210 may be made of an inorganic scintillation crystal material that has a high melting point, is not hygroscopic, does not emit magnetic radiation, and absorbs radiation with high intensity. For example, each of the scintillators 210 may be made of a material selected from $Gd_2SiO_5$:Ce (GSO:Ce), $Pr:Lu_3Al_5O_{12}$ (Pr:LuAG), $Gd_2Si_2O_7$:Ce (GPS), and halide-based materials.

The first optical sensor 310 can convert the incident light from the one end 200a of the scintillator unit 200 into a first optical signal LS1. In one embodiment, the first optical sensor 310 may be spaced apart from the one end 200a of the scintillator unit 200. In an alternative embodiment, the first optical sensor 310 may be adjacent to or in contact with the one end 200a of the scintillator unit 200. In this case, the first light guide member 410 is omitted from the system 10.

The second optical sensor 320 can convert the incident light from the other end 200b of the scintillator unit 200 into a second optical signal LS2. In one embodiment, the second optical sensor 320 may be spaced apart from the other end 200b of the scintillator unit 200. In an alternative embodiment, the second optical sensor 320 may be in contact with or adjacent to the other end 200b of the scintillator unit 200. In this case, the second light guide member 420 is omitted from the system 10.

The first and second light sensors 310 and 320 can sense the light generated in the scintillator unit 200. In one embodiment, each of the first and second optical sensors 310 and 320 may be a silicon photomultiplier SiPM but is not limited thereto.

The first light guide member 410 may be positioned between the first optical sensor 310 and the one end 200a of the scintillator unit 200 to guide the light irradiated from the one end 200a of the scintillator unit 200 to the first optical sensor 310.

The second light guide member 420 may be positioned between the second light sensor 320 and the other end 200b of the scintillator unit 200 to guide the light irradiated from the other end 200b of the scintillator unit 200 to the second light sensor 320.

The first and second light guide members 410 and 420 may be optical fibers but are not limited thereto. In one embodiment, each of the first and second light guide members 410 and 420 may have a straight shape. In an alternative embodiment, each of the first and second light guide members 410 and 420 may have a curved shape.

The location information acquisition unit 500 can receive the first optical signal LS1 and the second optical signal LS2. The location information acquisition unit 500 can use the first and second optical signals LS1 and LS2 to acquire information on where the light is generated in the scintillator unit 200. The location information acquisition unit 500 may use the information on where the light is generated, to acquire information PI on where the radiation leaks out. The information PI on where the radiation RAY in an inspection object leaks out may be provided as X-Y coordinates for the location of the radiation source. For example, the inspection object may be a nuclear reactor and the radiation source may be a location where radiation leakage occurs as a result of damage to the nuclear reactor.

In one embodiment, the location information acquisition unit 500 may extract first optical energy information on the first optical signal LS1 from the first optical signal LS1 and may extract second optical energy information on the second optical signal LS2 from the second optical signal LS2. The location information acquisition unit 500 can use the first light energy information and the second light energy information to acquire the information on which the light is generated. For example, the location information acquisition unit 500 can calculate a depth of interaction (DOI) defined by Equation 1:

$$DOI = K\frac{A-B}{A+B} + C \qquad \text{Equation 1)}$$

where A is the first light energy information and B is the second light energy information.

In Equation 1, $$\frac{A-B}{A+B}$$

may be the signal asymmetry. The location information acquisition unit 500 can determine the K and C values from a linear regression. That is, the location information acquisition unit 500 can use the first light energy information and the second light energy information to acquire DOI, which corresponds to the information on where the light is generated in the scintillator unit 200. Here, DOI may be the distance from the center of the scintillator unit 200 to a location where the light LM is generated.

As described above, the location information acquisition unit 500 can use the information on where the light is generated to acquire the information on where the radiation RAY leaks out. In one embodiment, the location information acquisition unit 500 may acquire the information PI on where the radiation leaks out based on the information on where the light is generated, previously stored information on the collimator unit 100, and previously stored location information on an inspection object. For example, the previously stored information on the collimator unit 100 may include information on the width of the passing spaces PS and information on the height of the collimators 110. The location information on an inspection object may include information on the distance between the scintillation unit 200 and the inspection object.

In another embodiment, the location information acquisition unit 500 may generate a first time stamp TA from the first optical signal LS1 and a second time stamp TB from the second optical signal LS2. The first time stamp may be the time when the first optical signal LS1 is input to the location information acquisition unit 500 and the second time stamp may be the time when the second optical signal LS2 is input to the location information acquisition unit 500. For example, the location information acquisition unit 500 may include a time-to-digital converter (TDC). Thus, the location information acquisition unit 500 can acquire the first time stamp from the first optical signal LS1 and the second time stamp from the second optical signal LS2.

The location information acquisition unit 500 can use the generated first and second time stamps to acquire the information on where the light is generated. For example, the location information acquisition unit 500 can calculate a depth of interaction (DOI) defined by Equation 2:

$$DOI = K\frac{(TA-TB)}{2} \times C \times \frac{1}{N} \qquad \text{Equation 2)}$$

where TA is the first time stamp, TB is the second time stamp, C is the speed of light ($3\times10^8$ m/s), N is the refractive index of the scintillator unit 200, and k is a constant.

Accordingly, the location information acquisition unit 500 can use the first and second time stamps to acquire DOI. As described above, the location information acquisition unit 500 can acquire the information on where the radiation RAY leaks out based on the information on where the light is generated. The location information acquisition unit 500 can transmit the information on where the radiation leakage occurs to the output unit 600.

The output unit 600 can receive the information PI on where the radiation leaks out from the location information acquisition unit 500. The output unit 600 can visually and audibly output the location of a source where the radiation RAY leaks out to a user based on the received information PI on where the radiation leaks out. For example, the output unit 600 may visually display the location of a source corresponding to the information PI on where the radiation leaks out on previously stored map information. The output unit 600 may be a display member.

Mode for Carrying Out the Invention

FIG. 3 is a schematic view illustrating a system for determining the location of a radiation source according to a further embodiment of the present invention. FIG. 4 is an exploded perspective view illustrating an exemplary scintillation unit of the system of FIG. 3. Some elements of the system are the same as those of the system described with reference to FIGS. 1 and 2 and a repeated explanation thereof is omitted or simplified for convenience of description.

Referring to FIGS. 3 and 4, the system 10 includes a collimator unit 100, a scintillator unit 200, a first optical sensor 310, a second optical sensor 320, and a location information acquisition unit 500. The system 10 may include an output unit 600 (see FIG. 2), a first light guide member 410, and a second light guide member 420. The system 10 may further include a first wavelength shifter 431, a second wavelength shifter 432, a first optical amplifier 441, and a second optical amplifier 442.

The scintillator unit 200 may include a plurality of scintillators 210 spaced apart from each other and adhesive members 220, each of which bonds the two adjacent scintillators 210 to each other.

Each of the adhesive members 220 may be positioned between the two adjacent scintillators 210 to bond the two adjacent scintillators 210 to each other. In one embodiment, the adhesive members 220 may be made of an optical epoxy but is not limited thereto.

Only one scintillator 210 may be provided for the scintillator unit 200 having a length of several meters. In this case, the scintillator unit 200 may be made of a plastic material only. The scintillator 210 made of a plastic material may be melted at a temperature of about 75° C. or higher and may generate low-intensity light, thus being unsuitable for use in a high-temperature environment. The scintillator unit 200 may include a plurality of scintillators 210 made of an inorganic scintillation crystal material and bonded to each other. In this case, the scintillator unit 200 has an elongated shape and is suitable for use in a high-temperature environment.

The first and second light guide members 410 and 420 may be curved in shape.

The first wavelength shifter 431 may be positioned between one end 200a of the scintillator unit 200 and the first light guide member 410. The first wavelength shifter 431 can convert the wavelength band of light propagating from the one end 200a of the scintillator unit 200 to the first light guide member 410 into a pass-band wavelength range of the first light guide member 410. The second wavelength shifter 432 may be positioned between the other end 200b of the scintillator unit 200 and the second light guide member 420. The second wavelength shifter 432 can convert the wavelength band of light propagating from the other end 200b of the scintillator unit 200 to the second light guide member 420 into a pass-band wavelength range of the second light guide member 420.

When radiation RAY is incident on the scintillators 210 of the scintillator unit 200, the scintillators 210 may generate light of different wavelength bands depending on their type. Only when the wavelength bands of the light generated in the scintillators 210 are within the pass-band wavelength ranges of the first and second light guide members 420 can the light propagate toward the first and second optical sensors 310 and 320. In consideration of this, the first and second wavelength shifters 431 and 432 serve to convert the wavelength band of the light generated in the scintillator unit 200 into the pass-band wavelength ranges of the first and second light guide members 410 and 420, respectively.

The first optical amplifier 441 may be positioned between the one end 200a of the scintillator unit 200 and the first light guide member 410. In one embodiment, the first optical amplifier 441 may be positioned between the first wavelength shifter 431 and the first light guide member 410. The first optical amplifier 441 can amplify light propagating from the one end 200a of the scintillator unit 200 toward the first light guide member 410.

The second optical amplifier 442 may be positioned between the other end 200b of the scintillator unit 200 and the second light guide member 420. In one embodiment, the second optical amplifier 442 may be positioned between the second wavelength shifter 432 and the second light guide member 420. The second optical amplifier 442 can amplify light propagating from the other end 200b of the scintillator unit 200 toward the second light guide member 420.

The scintillator unit 200 of the system 10 may connect the first and second light guide members 420, each of which may be elongated (for example, 50 m or greater in length) depending on its surrounding environment and structure. As the lengths of the first and second light guide members 420 increase, the light propagating from the scintillator unit 200 to the first and second light sensors 310 and 320 may be attenuated. In consideration of this, the first and second optical amplifiers 441 and 442 serve to increase the amount of the light irradiated from the scintillator unit 200 such that the increased amount of the light reaches the first and second optical sensors 310 and 320, respectively.

FIG. 5 is an exploded perspective view illustrating another exemplary scintillation unit of the system of FIG. 3. Some elements of the scintillation unit are the same as those of the scintillation units described with reference to FIGS. 1, 3, and 4 and a repeated explanation thereof is omitted or simplified for convenience of description.

Referring to FIG. 5, the scintillator unit 200 includes a plurality of scintillators 210 spaced apart from each other, adhesive members 220, and light guide units 230.

Each of the light guide units 230 may be positioned between the two adjacent scintillators 210. For example, the light guide units 230 may be optical fibers or quartz rods. The dimensions of the light guide units 230 may correspond to those of the scintillators 210 adjacent thereto. For example, the light guide units 230 may have the same thickness as the scintillators 210 adjacent thereto. The light guide unit 230 can guide light propagating from one of the scintillators 210 adjacent thereto to the other adjacent scintillator 210.

The adhesive members 220 can bond the adjacent scintillators 210 to the light guide units 230. For example, one of the two adjacent adhesive members 220 may bond one of the adjacent scintillators 210 to one end of the light guide unit 230 positioned between the adhesive members 220 and the other adhesive member 220 may bond the other scintillator 210 to the other end of the light guide unit 230. The adhesive members 220 may be made of an optical epoxy but is not limited thereto.

Assuming that the temporal resolution of the scintillators 210 of the scintillator unit 200 is 1 ns, the spatial resolution may be about 30 cm. Accordingly, even if the light guide units 230 are inserted between the scintillators 210 adjacent to each other, the spatial resolution may not be significantly affected. The insertion of the light guide units 230 between the scintillators 210 adjacent to each other can lead to a reduction in the manufacturing cost of the scintillator unit 200 without significantly deteriorating the performance of the scintillator unit 200.

FIG. 6 is a schematic diagram illustrating a system for determining the location of a radiation source according to another embodiment of the present invention. FIG. 7 is a schematic view illustrating a collimator unit of the system of FIG. 6. Some elements of the system are the same as those of the system described with reference to FIGS. 1 and 2 and a repeated explanation thereof is omitted or simplified for convenience of description.

Referring to FIGS. 6 and 7, the system 10 includes a collimator unit 100, a scintillator unit 200, a first optical sensor 310, a second optical sensor 320, and a location information acquisition unit 500. The system 10 may include an output unit 600, a cooling unit 700, a first light guide member 410, and a second light guide member 420.

The collimator unit 100 may include a housing 105 accommodating the scintillator unit 200 therein. The housing 105 may have a cylindrical shape. alternatively, the housing 105 may have a rectangular shape in cross section that is long in one direction.

The housing 105 may have a receiving hole 120 penetrating therethrough. The receiving hole 120 may connect one end to the other end of the housing 105. The receiving hole 120 may penetrate the housing 105 in a direction corresponding to the lengthwise direction of the scintillation unit 200. For example, the lengthwise direction of the receiving hole 120 may be parallel to the lengthwise direction of the scintillator unit 200.

The housing 105 may include a plurality of incident holes 130 extending in a first direction from the receiving hole 120 so as to penetrate the housing 105. The plurality of incident holes 130 may be spaced apart from each other. In one embodiment, the incident holes 130 may be spaced at regular intervals from each other. The incident holes 130 may be arranged along a lengthwise direction of the scintillator unit 200 (hereinafter, referred to as a "second direction"). In one embodiment, the first direction may be perpendicular to the second direction. Radiation RAY leaking from a source may be incident on the scintillator unit 200 through the incident holes 130. The incident holes 130 may correspond to the passing spaces PS described with reference to FIG. 1. The incident holes 130 may vertically overlap the scintillator unit 200.

The housing 105 may be made of a high-density metal material. For example, the housing 105 may be made of tungsten (W) or lead (Pb). The incident holes 130 of the housing 105 made of a high-density metal material can serve as collimators 110 to block the incident radiation RAY inclined at an angle from entering the scintillator unit 200. Here, the height of the incident holes 130 may correspond to the height of the collimators 110 of FIG. 1 and the diameter of the incident holes 130 may correspond to the width of the passing spaces PS.

The scintillator unit 200 may be positioned within the receiving hole 120. The scintillator unit 200 may vertically overlap the incident holes 130.

The cooling unit 700 can cool the scintillator unit 200. When the temperature of the scintillator unit 200 is increased above a predetermined level, the scintillator unit 200 may either lose its performance or may not be able to work at all. Accordingly, the cooling unit 700 controls the temperature of the scintillator unit 200 to ensure smooth functioning of the system 10.

In one embodiment, the cooling unit 700 may supply a fluid into the receiving hole 120. The fluid supplied into the receiving hole 120 can cool the scintillator unit 200 positioned within the receiving hole 120. The fluid may be a liquid or gas. The fluid can be introduced into the one end of the housing 105 and discharged through the other end of the housing 105.

FIG. 8 is a schematic view illustrating a system for determining the location of a radiation source according to another embodiment of the present invention. Some elements of the system are the same as those of the system described with reference to FIGS. 1 and 2 and a repeated explanation thereof is omitted or simplified for convenience of description.

Referring to FIG. 8, the system 10 includes a scintillator unit 200 including a light guide 250 and a plurality of scintillators 210.

The light guide 250 is a member arranged between a first optical sensor 310 and a second optical sensor 320. One end 200*a* of the light guide 250 is connected to the first optical sensor 310 and the other end 200*b* of the light guide 250 is connected to the second optical sensor 320. The light guide 250 may consist of optical fibers or quartz rods. The light guide 250 has a plurality of insertion holes 251. The insertion holes 251 are recessed from an outer surface of the light guide 250 and are spaced apart from each other. The plurality of scintillators 210 are inserted into the insertion holes 251. Specifically, each of the scintillators 210 is inserted into the corresponding insertion hole 251. Thus, the plurality of scintillators 210 are also spaced apart from each other. Here, the insertion holes 251 are disposed corresponding to passing spaces PS in a one-to-one relationship, that is, at positions that communicate in a one-to-one relationship with passing spaces PS. With this arrangement, radiation RAY entering one of the passing spaces PS is converted into light by the scintillator 210 inserted into the insertion hole 251 corresponding to the passing space PS and the light propagates along the light guide 250 and is detected by the first and second light sensors 310 and 320.

Due to its construction, the scintillator unit 200 can be easily manufactured even without using adhesive members 220 made of an optical epoxy, which is vulnerable to high temperatures (see FIGS. 3 to 5).

The one end 200*a* and the other end 200*b* of the light guide 250 may be in direct contact with and connected to the first and second light sensors 310 and 320, respectively. Alternatively, the one end 200*a* and the other end 200*b* of the light guide 250 may be in indirect contact with the first and second light sensors 310 and 320 through intervening elements between the one end 200*a* and the first optical sensor 310 and between the other end 200*b* and the second optical sensor 320, respectively. In one embodiment, a first wavelength shifter 431 and a first light guide member 410, a first optical amplifier 441 and a first light guide member 410 or a first wavelength shifter 431, a first optical amplifier 441, and a first light guide member 410 may be sequentially arranged in a direction from the one end 200*a* of the light guide 250 toward the first optical sensor 310 (see FIG. 3). In addition, a second wavelength shifter 432 and a second light guide member 420, a second optical amplifier 442 and a second light guide member 420 or a second wavelength shifter 432, a second optical amplifier 442, and a second light guide member 420 may be sequentially arranged in a direction from the other end 200*b* of the light guide 250 toward the second optical sensor 320 (see FIG. 3).

The scintillator unit 200 including the light guide 250 and the plurality of scintillators 210 are accommodated in a housing 105 and cooled by a cooling unit 700 (see FIG. 6).

FIGS. 9 and 10 are schematic views illustrating the operation of a system for determining the location of a radiation source according to one embodiment of the present invention. Some elements of the system are the same as those of the system described with reference to FIGS. 1 and 2 and a repeated explanation thereof is omitted or simplified for convenience of description.

Referring to FIG. 9, radiation RAY leaking from a source propagates toward the system 10. The radiation RAY reaches a collimator unit 100 of the system 10. The direction of the radiation RAY may vary. When the incident radiation RAY is inclined at an angle with respect to the scintillator unit 200, the collimator unit 100 can block the inclined radiation RAY from entering the scintillator unit 200. The radiation RAY incident in a direction substantially perpendicular to the lengthwise direction of the scintillator unit 200 can pass through the collimator unit 100.

Referring to FIG. 10, when the radiation RAY is incident on the scintillator unit 200 through the collimator unit 100, the scintillator unit 200 generates light LM at a location on which the radiation RAY is incident. The light LM generated in the scintillator unit 200 may propagate to one end 200*a* and the other end 200*b* of the scintillator unit 200.

Light L1 irradiated from the one end 200*a* of the scintillator unit 200 may reach a first optical sensor 310 through a first light guide member 410. When the light L1 irradiated from one end 200*a* of the scintillator unit 200 and arrives at the first optical sensor 310, the first optical sensor 310 generates a first optical signal LS1, which is then transmitted to an information acquisition unit 500.

Light L2 irradiated from the other end 200*b* of the scintillator unit 200 may reach a second optical sensor 320 through a second light guide member 420. When the light L2 irradiated from the other end 200*b* of the scintillator unit 200 and arrives at the first second optical sensor 320, the second optical sensor 320 generates a second optical signal LS2, which is then transmitted to the information acquisition unit 500.

The location information acquisition unit 500 can use the first and second optical signals LS1 and LS2 to acquire information on where the light is generated in the scintillator unit 200. The location information acquisition unit 500 can calculate information PI on where the radiation leaks out (see FIG. 2) based on the corresponding information on where the light is generated. The information PI is transmitted to an output unit 600. Based on the information PI, the output unit 600 can display the location of the source on previously stored map information.

Although the present invention has been particularly shown and described with reference to preferred embodiments thereof, it is not limited to the embodiments and it will be understood by those skilled in the art that various modifications are possible without departing from the gist of the present invention as defined from by the appended claims and such modifications should not be individually understood from the technical spirit or prospect of the present invention.

| [List of reference numerals] | |
| --- | --- |
| 10: System for determining the location of radiation source | |
| 100: Collimator unit | 200: Scintillator unit |
| 310: First optical sensor | 320: Second optical sensor |
| 410: First light guide member | 420: Second light guide member |
| 500: Location information acquisition unit | |
| 600: Output unit | 700: Cooling unit |

INDUSTRIAL APPLICABILITY

The use of the scintillation unit suitable even in a high-temperature environment allows the system of the present invention to monitor an inspection object in real time. In addition, the system of the present invention can be manufactured at low cost compared to prior art systems. Therefore, the system of the present invention is more price competitive than prior art systems.

The invention claimed is:

1. A system for determining the location of a radiation source, comprising:
a collimator unit through which radiation selectively passes depending on its incident direction;
a scintillator unit converting the incident radiation from the collimator unit into light;
a first optical sensor converting the incident light from one end of the scintillator unit into a first optical signal;
a second optical sensor converting the incident light from the other end of the scintillator unit into a second optical signal; and
a location information acquisition unit acquiring information on where the light is generated in the scintillator unit based on the first and second optical signals,
wherein the scintillator unit comprises:
a light guide arranged between the first and second optical sensors and having a plurality of insertion holes spaced apart from each other on an outer surface thereof; and
a plurality of scintillators, and
wherein each of the plurality of scintillators is inserted into a corresponding insertion hole such that an upper surface of each of the plurality of scintillators is disposed inside the corresponding insertion hole and below the outer surface of the light guide.

2. The system according to claim 1, wherein the location information acquisition unit generates first optical energy information on the first optical signal and second optical energy information on the second optical signal and uses the first optical energy information and the second light energy information to acquire the information on where the light is generated.

3. The system according to claim 1, wherein the location information acquisition unit generates a first time stamp from the first optical signal and a second time stamp from the second optical signal and uses the first and second time stamps to acquire the information on where the light is generated.

4. The system according to claim 1, wherein the collimator unit comprises a plurality of collimators spaced apart from each other and arranged between the one end and the other end of the scintillator unit.

5. The system according to claim 1, wherein the plurality of scintillators are spaced apart from each other by a plurality of adhesive members, and wherein each of the plurality of adhesive members bonds two adjacent scintillators to each other.

6. The system according to claim 5, wherein each of the plurality of scintillators is made of a material selected from the group consisting of $Gd_2SiO_5$:Ce (GSO:Ce), $PrIu_3Al_5O_{12}$ (Pr:LuAG), $Gd_2Si_2O_7$:Ce (GPS), and halide-based materials.

7. The system according to claim 1, further comprising a first light guide member positioned between the one end of the scintillator unit and the first optical sensor spaced apart from the one end of the scintillator unit to guide the light irradiated from the one end of the scintillator unit to the first optical sensor and a second light guide member positioned between the other end of the scintillator unit and the second optical sensor spaced apart from the other end of the scintillator unit to guide the light irradiated from the other end of the scintillator unit to the second optical sensor.

8. The system according to claim 7, further comprising a first wavelength shifter converting the wavelength band of the light propagating from the one end of the scintillator unit to the first light guide member into a pass-band wavelength range of the first light guide member and a second wavelength shifter converting the wavelength band of light propagating from the other end of the scintillator unit to the second light guide member into a pass-band wavelength range of the second light guide member.

9. The system according to claim 7, further comprising a first optical amplifier amplifying the light propagating from the one end of the scintillator unit to the first light guide member and a second optical amplifier amplifying the light propagating from the other end of the scintillator unit to the second light guide member.

10. The system according to claim 1, further comprising a cooling unit cooling the scintillator unit wherein the collimator unit comprises a housing, a receiving hole penetrating the housing in a direction corresponding to the lengthwise direction of the scintillator unit, and a plurality of incident holes extending in a first direction from the receiving hole so as to penetrate the housing and spaced apart from each other, wherein the scintillator unit is positioned in the receiving hole and overlaps the incident holes, and wherein the cooling unit supplies a fluid into the receiving hole to cool the scintillator unit.

11. The system according to claim 10, wherein the housing is made of tungsten (W) or lead (Pb).

* * * * *